(12) United States Patent     (10) Patent No.:   US 12,621,415 B2

Wisnia et al.     (45) Date of Patent:     May 5, 2026

(54) SYSTEM FOR ENABLING A CAMERA-GENERATED VIDEO STREAM ON AN OEM VEHICLE SCREEN AND METHOD OF USE THEREOF

(71) Applicant: 14788591 Canada Inc., Dollard-des Ormeaux (CA)

(72) Inventors: Jack Wisnia, Dollard-des Ormeaux (CA); Feng Du, Kirkland (CA)

( * ) Notice: Subject to any disclaimer, the term of this patent is extended or adjusted under 35 U.S.C. 154(b) by 0 days.

(21) Appl. No.: 19/235,986

(22) Filed: Jun. 12, 2025

(65) Prior Publication Data

US 2026/0006159 A1    Jan. 1, 2026

Related U.S. Application Data

(60) Provisional application No. 63/664,509, filed on Jun. 26, 2024.

(51) Int. Cl.

| | |
|---|---|
| *H04N 7/18* | (2006.01) |
| *H04N 23/661* | (2023.01) |
| *H04W 4/30* | (2018.01) |
| *H04W 4/80* | (2018.01) |
| *H04W 84/12* | (2009.01) |

(52) U.S. Cl.
CPC ........... *H04N 7/183* (2013.01); *H04N 23/661* (2023.01); *H04W 4/30* (2018.02); *H04W 4/80* (2018.02); *H04W 84/12* (2013.01)

(58) Field of Classification Search
CPC ....... H04N 7/183; H04N 23/661; H04W 4/30; H04W 4/80; H04W 84/12; G08C 2201/91
See application file for complete search history.

(56) References Cited

U.S. PATENT DOCUMENTS

| | | | |
|---|---|---|---|
| 7,100,190 B2 | 8/2006 | Johnson et al. | |
| 10,142,420 B2 * | 11/2018 | Lei | H04W 12/069 |
| 10,706,648 B2 * | 7/2020 | Plante | G07C 5/085 |
| 11,019,298 B2 * | 5/2021 | Galluzzi | H04N 7/181 |
| 12,134,356 B2 * | 11/2024 | Kaminski | B60R 1/22 |
| 2005/0036622 A1 | 2/2005 | Hay et al. | |

(Continued)

FOREIGN PATENT DOCUMENTS

| | | |
|---|---|---|
| CN | 101783931 A | 7/2010 |
| CN | 102307293 A | 1/2012 |

(Continued)

*Primary Examiner* — Jared Walker

(74) *Attorney, Agent, or Firm* — Anglehart et al.

(57) ABSTRACT

A system for causing a display of a video on an original equipment manufacturer (OEM) display of a land vehicle; it has a camera for generating the video, the camera for fastening to the vehicle; and a router for communicating with the camera, comprising a wireless input/output interface; and a controller configured to receive via the input/output interface an Internet signal through tethering using a short-range wireless network generated by the portable computer; generate an Internet signal from the local wireless network generated by a portable computer to enable WiFi by the vehicle; transmit a command to the camera to start producing a video and to transmit the video to the router; receive the video from the camera; and transmit wirelessly the received video to an IP address of a web server hosted locally by the router; and a method of use thereof.

8 Claims, 4 Drawing Sheets

(56)     References Cited

U.S. PATENT DOCUMENTS

| | | | | |
|---|---|---|---|---|
| 2007/0015486 | A1 | 1/2007 | Marlowe | |
| 2011/0007159 | A1 | 1/2011 | Camp et al. | |
| 2011/0312278 | A1* | 12/2011 | Matsushita | H04W 4/80 |
| | | | | 455/66.1 |
| 2017/0171893 | A1* | 6/2017 | Gerlach | H04W 76/10 |
| 2019/0193646 | A1* | 6/2019 | Blaicher | H04N 7/18 |
| 2020/0084366 | A1* | 3/2020 | Fujiwara | H04R 3/005 |
| 2021/0377574 | A1* | 12/2021 | Miller | G06F 9/452 |
| 2022/0396208 | A1* | 12/2022 | Kaminski | B60R 11/04 |
| 2024/0298154 | A1* | 9/2024 | Tian | H04W 4/46 |

FOREIGN PATENT DOCUMENTS

| | | | |
|---|---|---|---|
| CN | 103167271 | A | 6/2013 |
| CN | 204377046 | U | 6/2015 |
| CN | 110339517 | A | 10/2019 |
| CN | 117584928 | A | 2/2024 |
| JP | 2023127165 | A | 9/2023 |

\* cited by examiner

SYSTEM FOR ENABLING A CAMERA-GENERATED VIDEO STREAM ON AN OEM VEHICLE SCREEN AND METHOD OF USE THEREOF

The present application claims priority from U.S. provisional patent application No. 63/664,509 filed on Jun. 26, 2024, incorporated herein by reference.

TECHNICAL FIELD

The present disclosure relates to after-market additions for motor vehicles, and more particularly to after-market cameras for motor vehicles.

BACKGROUND

Certain land vehicles impose certain conditions for use of a local WiFi signal therein (a local wireless network). Such vehicles include, but are not limited to, Tesla™ electric vehicles. As such, this limitation can impede the installation of certain after-market add-ons for the vehicle which depend on a WiFi for communicating information to the vehicle, or to equipment found within the vehicle. An exemplary after-market add-on may be an after-market camera to be installed on the outside of the vehicle.

As such, it would be advantageous to arrive at a solution to leverage a WiFi made available in the vehicle despite prohibitions imposed by the vehicle on the use of the WiFi by the vehicle.

SUMMARY

The present disclosure relates systems and methods for sharing information generated by an after-market device (e.g. a video stream generated by an after-market camera) on an original equipment manufacturer (OEM) screen of a land vehicle using a WiFi made available in the vehicle, when the vehicle imposes certain restrictions on use or availability of a WiFi made available within the vehicle. For instance, a vehicle may only enable use of a local WiFi signal within the vehicle when the local WiFi signal, or the source of the local WiFi signal, is connectable to the Internet or has established an Internet connection.

The present system includes a router, for installation in the vehicle, that receives a wireless WiFi signal from a portable computing device using a short-range wireless connection (e.g. a Bluetooth™ connection) through tethering (e.g. a Bluetooth™ Hotspot™). The router then outputs a wireless signal for establishing a connection with the Internet from the short-range wireless connection established with the portable computing device through tethering of the short-range wireless connection. The vehicle now permits use of the WiFi signal also generated by the router. As such, the router generates a local area network for use within the vehicle.

The router then transmits a command to the after-market device (e.g. the camera), installed on the vehicle, to begin generating data (e.g. in the case of a camera, the command is to begin generating an image stream).

The router receives the data (e.g. the image stream) generated by the after-market device transmitted via the local area network. The router causes the data to be made available on a webserver, by hosting the data on the webserver for viewing from the webserver, using the enabled local area network, accessible using a given IP address.

A user of the vehicle may access the data (e.g. the video) by providing as user input on an input interface of the vehicle the string of characters corresponding to the IP address, thereby causing the OEM screen of the vehicle to display the information found on the webserver corresponding to the IP address.

A broad aspect is a system for causing a display of a video on an original equipment manufacturer (OEM) screen of a land vehicle. The system includes a camera for generating the video, the camera for fastening to the vehicle; and a router for installation in the vehicle for communicating with the camera, including a wireless input/output interface; and a controller configured to: establish via the input/output interface a short-range wireless connection via tethering initiated by a portable computer; generate via the input/output interface a wireless signal, from the local wireless network generated by a portable computer, to establish an Internet connection and to a enable WiFi connection by the vehicle; generate a local area network; transmit a command to the camera to start producing a video and to transmit the video to the router over the local area network; receive the video from the camera over the local area network; and transmit over the local area network the received video to an IP address of a web server hosted locally by the router, whereby a user may view the video of the camera on the OEM screen by providing to the vehicle as input a string of characters corresponding to the IP address.

In some embodiments, the system may include a fastener for attaching the camera to the vehicle.

In some embodiments, the vehicle may be an electric vehicle.

In some embodiments, the portable computer may be a smartphone.

In some embodiments, the local wireless network may be via Bluetooth™ tethering.

Another broad aspect is a road vehicle comprising the system as defined herein.

Another broad aspect is a method of enabling a display of a video on an original equipment manufacturer (OEM) display of a land vehicle. The method includes receiving a wireless signal for establishing an Internet connection through tethering of a short-range wireless signal; generating and transmitting a wireless connection for establishing an Internet connection for permitting use by the vehicle of a WiFi signal established via a local area network; generating a WiFi signal via a local area network, the WiFi signal permitted by the vehicle; causing a camera attached to the vehicle to generate an image stream; receiving the image stream generated by the vehicle camera; and transmitting wirelessly over the local area network the received video to a web server hosted locally by the router, whereby a user may view the image stream generated by the camera on the OEM display by providing to the vehicle as input a string of characters corresponding to an IP address of the web server.

In some embodiments, the causing a camera may be triggered upon a turning on of the vehicle.

Another broad aspect is a non-transitory computer-readable medium having stored thereon program instructions for causing a display of a video on an original equipment manufacturer (OEM) screen of a land vehicle, the program instructions executable by a processing unit for establishing a short-range wireless connection via tethering initiated by a portable computer; generating a wireless signal, from the local wireless network generated by a portable computer, to establish an Internet connection and to a enable WiFi connection by the vehicle; generating a local area network; transmitting a command to a camera attached to the vehicle to start producing a video and to transmit the video to the router over the local area network; receiving the video from the camera over the local area network; and transmitting over the local area network the received video to an IP address of a web server hosted locally by the router, whereby a user may view the video of the camera on the OEM screen by providing to the vehicle as input a string of characters corresponding to the IP address.

BRIEF DESCRIPTION OF THE DRAWINGS

The invention will be better understood by way of the following detailed description of embodiments of the invention with reference to the appended drawings, in which.

DETAILED DESCRIPTION

Figure 1:
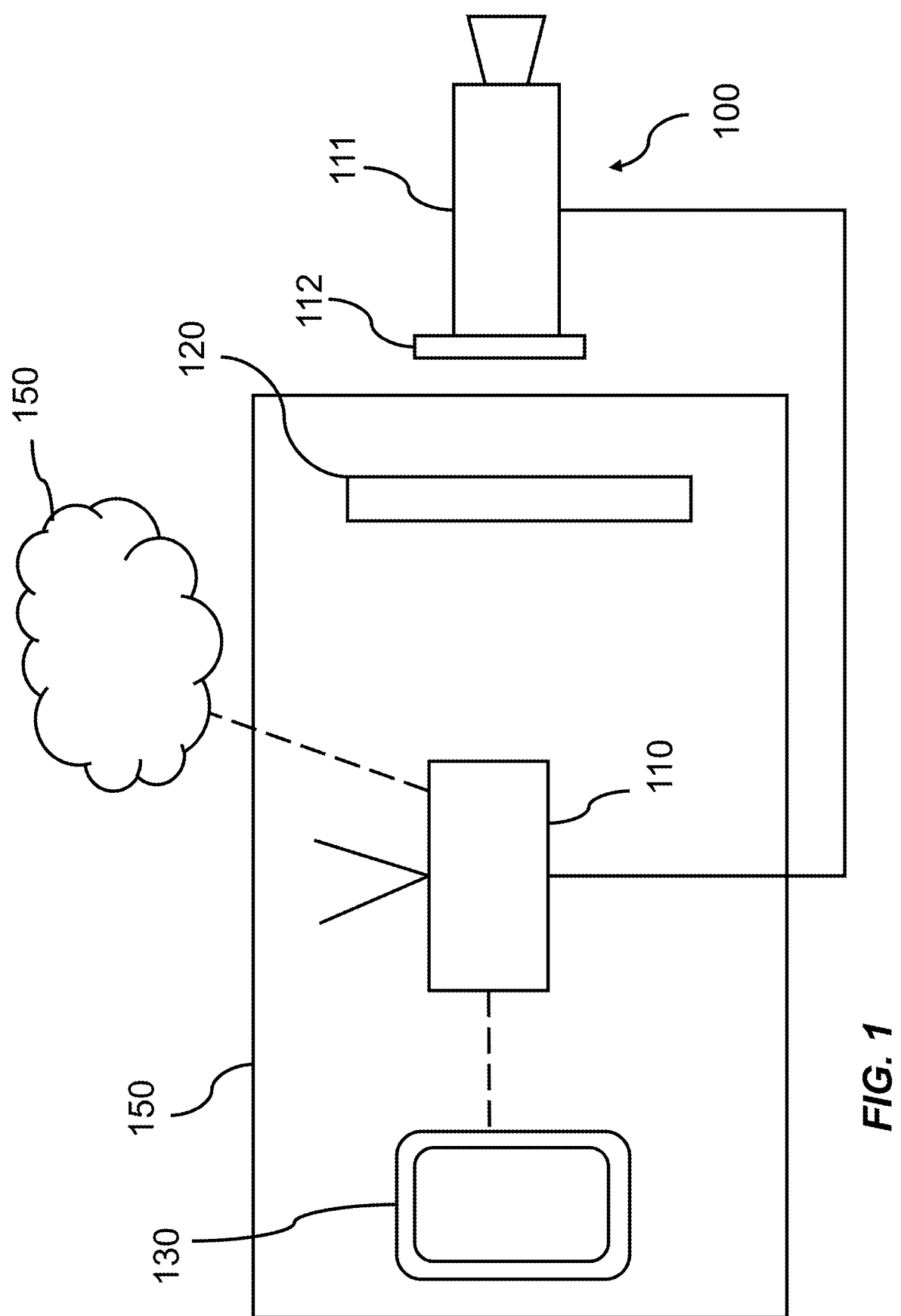
FIG. 1 is a block diagram of an exemplary system for enabling the display of an image stream generated by an after-market camera on an OEM screen of a vehicle.

The present disclosure relates to systems and methods for enabling data produced by an after-market device (e.g. a camera) on an original equipment manufacturer (OEM) screen of a vehicle (such as the screen of the vehicle's infotainment system), particularly when the vehicle imposes certain conditions for permitting use of WiFi signal within the vehicle. In some examples, the vehicle is an electric vehicle, such as a Tesla™ vehicle.

For purposes of illustration, an exemplary camera will be used as an example of an after-market device. However, it will be understood that other sensors may be used, such as a tire pressure gauge, a thermometer, etc., without departing from the present teachings. In some instances, more than one after-market device may share data generated by the after-market device for viewing on the OEM screen of the vehicle.

In some instances, the after-market device may be a smartphone or portable computer (in some instances, the same portable computer that is supplying the tethering of the short-range wireless connection to the router).

The video stream to be viewed using the hosted web-server, on the OEM screen of the vehicle, may be a mirroring of the display of the smartphone, where the mirror of the display of the smartphone is transmitted as an image stream to the router for viewing on the OEM screen through the webserver.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

From the foregoing it will be appreciated that, although specific embodiments have been described herein for purposes of illustration, various modifications may be made without deviating from the spirit and scope of the teachings. Accordingly, the claims are not limited by the disclosed embodiments.

Definitions

In the present disclosure, by "vehicle", it is meant a motorized object used for transporting people or goods, especially on land or on water, and includes, but is not limited to, a car, a truck, a tractor, a motorboat, etc. An exemplary vehicle is an electric land vehicle, like a car or truck, such as a Tesla™ vehicle.

Exemplary System for Enabling the Viewing of an Image Stream Generated by an after-Market Camera on an OEM Screen of a Vehicle:

Reference is now made to FIG. 1, illustrating an exemplary system 100 for enabling the viewing of an image stream generated by an after-market camera on an OEM screen of a vehicle.

The system 100 includes a router 110 and a camera 111.

The router 110 generates both a wireless signal for establishing an Internet connection 150 and a local area network WiFi signal for transmitting commands to the camera 111 to begin generating an image stream, to receive the image stream from the camera 111 and to transmit the image stream to a local webserver hosted by the server 110 for viewing the image stream on the OEM screen 120.

The system 100 interacts with an OEM screen 120 of a vehicle 150. The OEM screen 120 may be part of an infotainment system of the vehicle 150. The OEM screen 120 may be a touchscreen, or may include a user input interface to provide user input to cause an interaction with the screen 120, such as by receiving as user input the string of characters corresponding to the IP address of the web-server for viewing the image stream produced by the camera.

The system 100 interacts with a portable device 130 (e.g. a smartphone, a tablet, a laptop, etc.). The portable device 130 can cause tethering of a short-range wireless connection with the router 110 to provide an Internet connection to the router 110.

The router then generates and transmits a wireless signal for establishing a connection with the Internet 150.

In some embodiments, a fastener 112 may be provided for fastening the camera 111 to the vehicle 150. The fastener 112 may be, for instance, one or more screws, one or more bolts, one or more protrusions for fitting into a space or opening, etc. In some instances, the fastener 112 may fasten the camera 111 to the license plate frame of the vehicle 150, to the bumper of the vehicle 150, etc.

Figure 2:
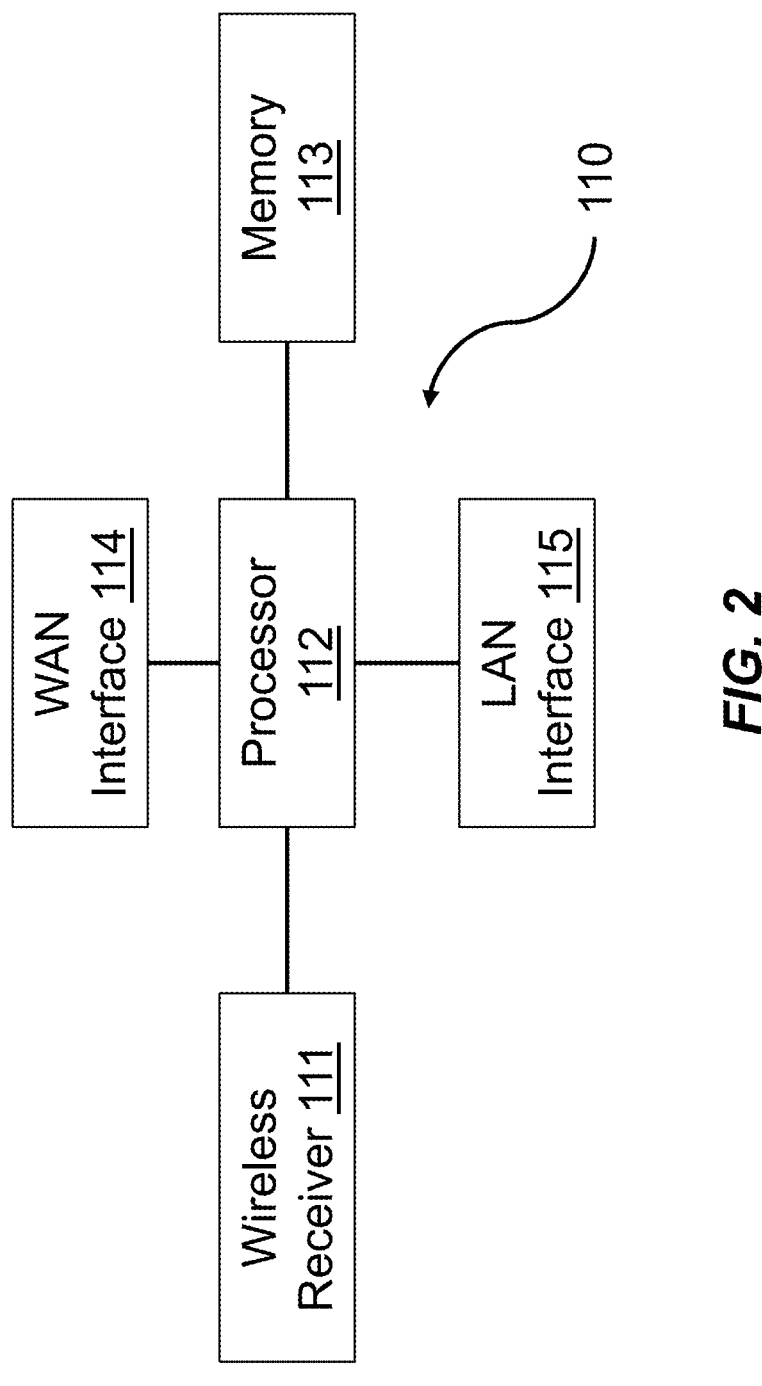
FIG. 2 is a block diagram of the exemplary router of the system of FIG. 1.

Exemplary Router for Generating a Wifi Signal:

Reference is now made to FIG. 2, illustrating an exemplary router 110 in accordance with the present teachings.

The router 110 includes a processor 112, memory 113, a wireless receiver 111, a WAN interface 114 and a LAN interface 115. It will be understood that in some instances, two or more of the wireless receiver 111, the WAN interface 114 and the LAN interface 115 may be same component (e.g. a wireless transceiver).

The processor 112 may be a general-purpose programmable processor. In this example, the processor 112 is shown as being unitary, but the processor 112 may also be multicore, or distributed (e.g. a multi-processor).

The computer readable memory 113 stores program instructions and data used by the processor 112. The computer readable memory 113 may also store one or more a local webserver, IP address information, the address of the camera 111, etc. The memory 113 may be non-transitory. The computer readable memory 113, though shown as unitary for simplicity in the present example, may comprise multiple memory modules and/or caching. In particular, it may comprise several layers of memory such as a hard drive, external drive (e.g. SD card storage) or the like and a faster and smaller RAM module. The RAM module may store data and/or program code currently being, recently being or soon to be processed by the processor 112 as well as cache data and/or program code from a hard drive. A hard drive may store program code and be accessed to retrieve such code for execution by the processor 112 and may be accessed by the processor 112 to store and access data. The memory 113 may have a recycling architecture for storing, for instance, video streams, where older data files are deleted when the memory 113 is full or near being full, or after the older data files have been stored in memory 113 for a certain time.

The processor 112 and memory 113 may also be referred to herein as a controller (e.g. a microcontroller) for purposes of operating the router 110.

The LAN Interface 115 is in communication with the processor 112. The LAN interface 115 may include a network interface. For instance, the LAN interface 115 may be an Ethernet port, a WAN port. In some instances, there may be a TCP port, a UDP port, etc.

The WAN Interface 114 is in communication with the processor 112. The WAN interface 114 may include a network interface. For instance, the WAN interface 114 may be an Ethernet port, a WAN port, etc.

The wireless receiver 111 is in communication with the processor 112. The wireless receiver 111 may include a network interface. For instance, the wireless receiver 111 may be an Ethernet port, a WAN port. In some instances, there may be a TCP port, a UDP port, etc.

The wireless receiver 111, the WAN interface 114 and the LAN interface 115 may be referred to herein collectively as an input/output interface.

The processor 112, the memory 113, the wireless receiver 111, the WAN interface 114 and/or the LAN interface 115 may be linked via bus connections.

Figure 3:
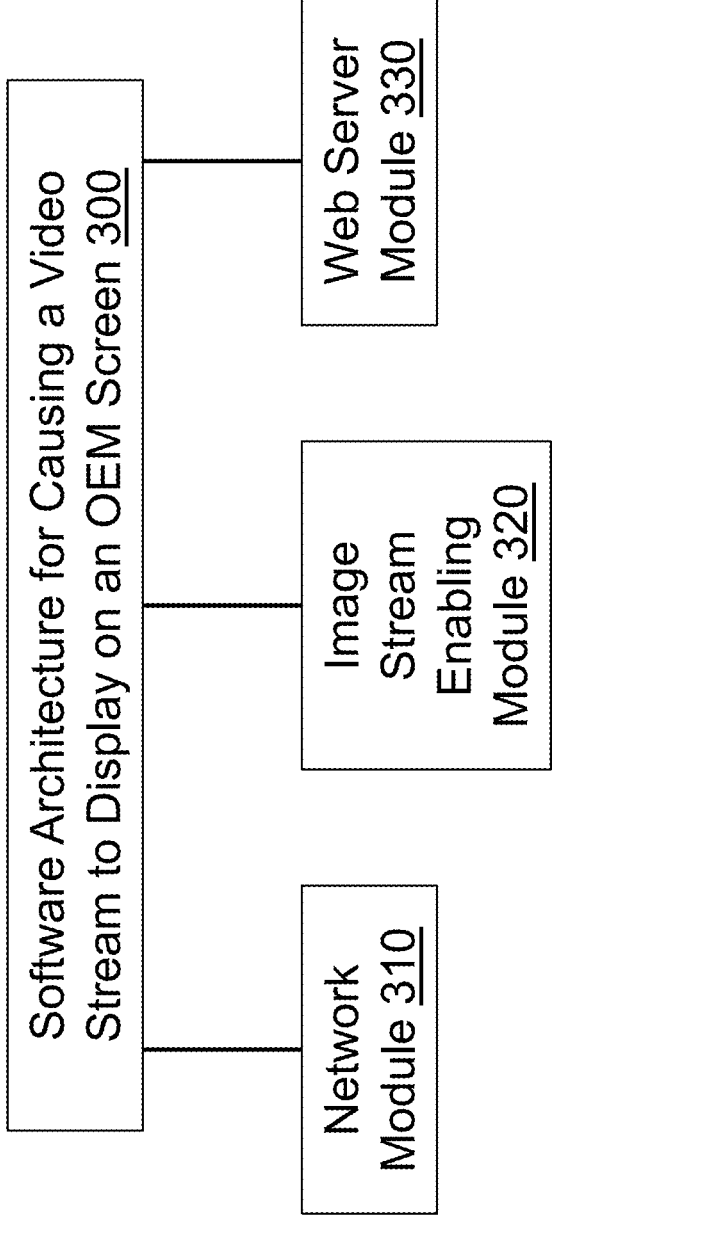
FIG. 3 is a block diagram of an exemplary software architecture for causing an image stream generated by an after-market camera to be displayed on an OEM screen of a vehicle.

Exemplary Software Architecture for Causing an Image Stream Generated by an after-Market Camera to Display on an OEM Screen of a Vehicle:

Reference is now made to FIG. 3, illustrating exemplary software architecture 300 for causing a video stream generated by an after-market camera to appear on an OEM screen of a vehicle.

The router 110 has program code, stored in memory 101, that includes a network module 310. The router 110 has program code, stored in memory 101, that includes an image stream enabling module 320. The router 110 has program code, stored in memory 101, that includes a web server module 330. Each of the network module 310, the image stream enabling module 320 and web server module 330 includes program code configured to implement the functionality of the modules as is described herein.

The network module 310 includes program code stored in memory 113 that, when executed by the processor 112, causes the processor 112 to receive a wireless signal from a tethering of a short-range wireless connection generated by the portable computer 130 (e.g. via a Bluetooth™ Hotspot™). The network module 310 may verify the identity of the portable computer generating the short-range wireless connection for security purposes. The network module 310 also includes program code that causes the processor 112 to generate a wireless signal for establishing an Internet connection. The network module 310 also includes program code for causing the processor 112 to generate a local area network (LAN) for establishing a WiFi connection for purposes of communicating with the camera 111, and transmitting the image stream generated by the camera 111 to a webserver for viewing on the screen 120.

The image stream enabling module 320 includes program code stored in memory 113 that, when executed by the processor 112, causes the processor 112 to generate a command, for transmission over the established LAN network, for causing the camera 111 to begin generating an image stream and transmitting the command to the camera 111. In some instances, the turning on of the vehicle 150 may cause a transmission of a signal to the router 110 indicative of the state of the vehicle 150 (e.g. power may be supplied from the vehicle 150 to the router 110 when the vehicle 111 is running) to the router 110 which, in turn, via the image stream enabling module 320, causes the camera 111 to start generating an image stream. In some instances (for instance, when the camera is a back-up camera), the shifting of gears (e.g. putting the vehicle in reverse) may cause the generating of the command to start generating the video stream (e.g. in some instances, the router 110 may include one or more accelerometers/gyroscopes for detecting movement of the vehicle).

In some instances, the image stream enabling module 320 may also include program code for causing the processor 112 to generate a command for transmission to the camera 111 to stop the generating of the image stream upon occurrence of a trigger detected at the router 110. For instance, a trigger may be the turning off of the vehicle 150, the shifting of a gear, etc. In some instances, turning off of the vehicle 150 may result in the shutting of the router 110, and resulting the LAN network generated by the router 110 is no longer provided. The camera 111 may be configured to stop generating an image stream when the camera no longer detects the LAN network of the router 110.

The web server module 330 includes program code stored in memory 113 that, when executed by the processor 112, causes the processor 112 to host a web server corresponding to a given IP address (where the WEB server can only serve the webpage to the local WiFi using the LAN network). The web server module 330 causes the processor 112 to receive the image stream from the camera 111. The web server module 330 enables the video stream to be viewable from the web server, accessible using the IP address, through the OEM screen 120.

Figure 4:
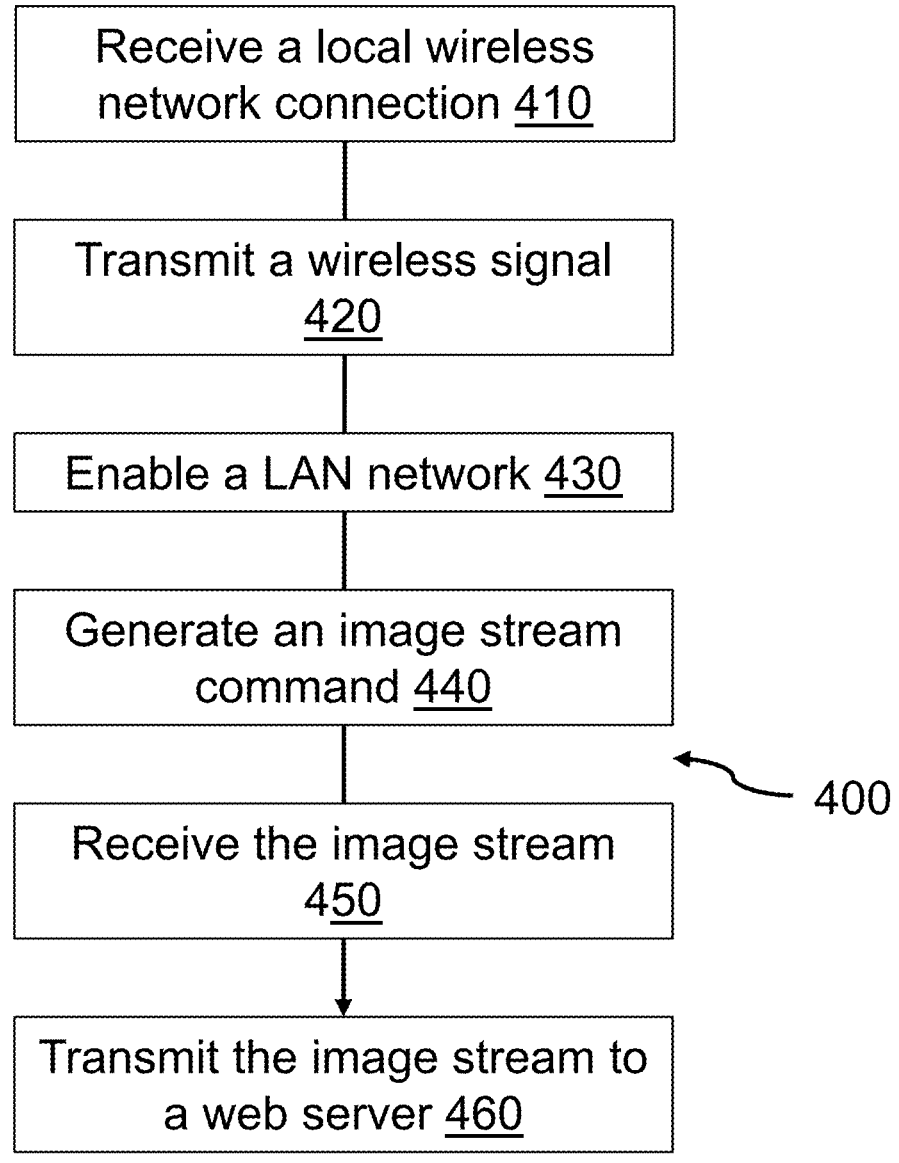
FIG. 4 is a flowchart diagram of an exemplary method for enabling the display of an image stream generated by an after-market camera on an OEM screen of a vehicle.

Exemplary Method of Enabling Viewing of an Image Stream Produced by an after-Market Camera on an OEM Screen of a Vehicle:

Reference is now made to FIG. 4, illustrating an exemplary method 400 for enabling viewing of an image stream produced by an after-market camera on an OEM screen of a vehicle. The method 400 may be performed by router 110, or any other router in accordance with the teachings of the present disclosure.

A short-range wireless connection is established using tethering from a local portable device (e.g. a smartphone, a laptop, a tablet computer, etc.) to receive a WiFi signal from the portable device for establishing an Internet connection at step 410. For instance, the tethering using a short-range wireless connection may be a Bluetooth Hotspot™.

A wireless signal is generated and transmitted at step 420, for establishing an Internet connection. The wireless signal is routed from the WiFi signal received from the portable computing device. Depending on the conditions verified by the vehicle to permit usage of WiFi signal within the vehicle, the vehicle may verify that the wireless signal is connected or connectable to the Internet, thereby causing the vehicle to allow use of the WiFi signal generated by the same router. This can be case for a Tesla vehicle, where the vehicle may only permit a wireless signal that is connected or connectable to the Internet.

A local area network is then generated at step 430 by the same router having general the wireless signal for establishing the Internet connection. The local area network is for generating a WiFi signal associated with the vehicle.

A command is then generated at step 440 for causing a camera to begin producing an image stream. The command may include the identity information of the camera, an address of the router for transmission of the video by the camera, and/or credentials of the router for a security verification by the camera. The command is transmitted over the LAN network to the camera.

In some instances, the command to initiate a production of an image stream by the camera may be initiated by the turning-on of the vehicle (e.g. when the router is connected to the vehicle, the vehicle supplies power to the router when the vehicle is running, and the transmission of power by the vehicle to the router acting as a signal for the router to generate and transmit the command to begin generating an image stream by the camera). In some instances, the generating of the command to produce the image stream may be triggered by a gear shift of the vehicle (shifting from a "parked" mode, to a "drive" mode). In some instances, the router may include a user input interface (e.g. a button, a touchpad), where input provided by the user on the user interface may cause the generating and the transmitting of the command to begin producing the image stream by the camera.

The image stream generated by the camera is received at step 450, e.g., over the LAN network by the router. In some instances, a codec may be provided at the router to decode the image stream received from the camera.

The received image stream is transmitted to a webserver corresponding to a web server corresponding to a given IP address at step 460 over the LAN network. The webserver may be stored by the router. The router may include a GPU/codec for encoding and/or compressing the image stream prior to transmission for viewing on the webserver. The image stream may then be accessible from the OEM screen of the vehicle once the user enters into a user input interface the string of characters or information corresponding to the IP address of the webserver, where access to the webserver enables viewing of the video on the screen of the vehicle.

In some instances, a command may also be generated to end the generation of the image stream by the camera. For instance, the command to end the generation of the image stream may be caused by the vehicle shifting gears (e.g.

from "drive" to "park"), or from the turning off of the vehicle (e.g. when the router is powered by the router, the turning off of the vehicle may cause the router to no longer receive power, the absence of power acting as a signal for the router to trigger the generation and transmission of the command to end the generation of the image stream). In some instances, the turning off of the vehicle causes the router to no longer be supplied by power originating from the vehicle. The absence of power from the vehicle may cause the router to shut off, thereby ending the WiFi signals (for establishing an Internet connection, and to generate the LAN network) produced by the router. When the LAN network is no longer available, the camera may no longer transmit the image stream to the router. When the camera may no longer transmit the image stream to the router, this can cause the camera to stop generating the image stream, and optionally, to shut off.

In some instances, the camera may also be supplied power by the vehicle. In these examples, the absence of power from the vehicle may cause the camera to shut off. In some instances, the camera may be powered from a battery.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. An after-market system for causing a display of a video on an original equipment manufacturer (OEM) screen of a land vehicle, comprising:

an after-market camera, adapted for installation on a vehicle after manufacturing of the vehicle, for generating the video, the camera for fastening to the vehicle; and an after-market router for installation after manufacturing of the vehicle in the vehicle for communicating with the camera, the router comprising:

a wireless input/output interface comprising a LAN interface; and a controller configured to:

establish via the input/output interface a short-range wireless connection with a portable computer via tethering initiated by the portable computer to receive a WiFi signal from the portable computer;

generate via the input/output interface a wireless signal, where the wireless signal is routed from the short-range wireless connection generated by a portable computer, to establish an Internet connection and to enable a WiFi connection by the vehicle;

generate a local area network;

transmit a command to the camera to start producing a video and to transmit the video produced by the camera to the router over the local area network generated by the router;

receive the video from the camera over the local area network; and transmit over the local area network via the LAN interface the received video to an IP address of a web server hosted locally by the router, the web server stored by the router, whereby the video of the camera is viewable on the OEM screen by providing to the vehicle as input a string of characters corresponding to the IP address.

2. The system in accordance with claim 1, further comprising a fastener for attaching the camera to the vehicle.

3. The system in accordance with claim 1, wherein the vehicle is an electric vehicle.

4. The system in accordance with claim 1, wherein the portable computer is a smartphone.

5. A road vehicle comprising the system as defined in claim 1.

6. A method of enabling a display of a video on an original equipment manufacturer (OEM) display of a land vehicle through installation of an after-market router, comprising:

receiving a short-range wireless signal from a portable computer for establishing an Internet connection through tethering with the portable computer;

generating and transmitting a wireless signal by routing the Internet connection using the after-market router, that was installed in the vehicle after manufacturing of the vehicle, for establishing an Internet connection and to enable a WiFi connection by the vehicle;

generating a local area network using the router;

causing an after-market camera attached to the vehicle after manufacturing of the vehicle to generate an image stream;

receiving the image stream generated by the vehicle camera over the local area network; and transmitting wirelessly via a LAN interface of the router over the local area network the received video to a web server hosted locally by the router, the web server stored by the router, whereby a user may view the image stream generated by the camera on the OEM display by providing to the vehicle as input a string of characters corresponding to an IP address of the web server.

7. The method as defined in claim 6, wherein the causing a camera is triggered upon a turning on of the vehicle.

8. A non-transitory computer-readable medium having stored thereon program instructions for causing a display of a video on an original equipment manufacturer (OEM) screen of a land vehicle through installation of an after-market router, the program instructions executable by a processing unit for:

establishing a short-range wireless connection via tethering initiated by a portable computer;

generating a wireless signal, where the wireless signal is routed from the short-range wireless connection established with the portable computer, to establish an Internet connection using the router and to enable a WiFi connection by the vehicle;

generating a local area network;

transmitting a command to an after-market camera attached to the vehicle after manufacturing of the vehicle to start producing a video and to transmit the video to the router over the local area network;

receiving the video from the camera over the local area network; and transmitting over the local area network via a LAN interface of the router the received video to an IP address of a web server hosted locally by the router, the web server stored by the router, whereby the video of the camera is viewable on the OEM screen by providing to the vehicle as input a string of characters corresponding to the IP address.

* * * * *